Figure 1:
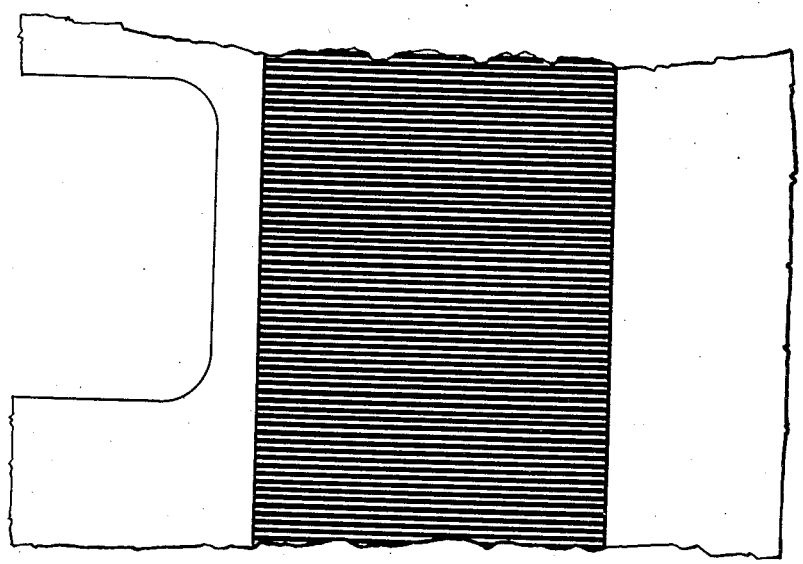

April 17, 1934.  J. A. MAURER, JR  1,955,386
TEST RECORD AND METHOD OF UTILIZING THE SAME
Filed Aug. 1, 1931   2 Sheets-Sheet 1

INVENTOR
JOHN A. MAURER JR.
BY
ATTORNEY

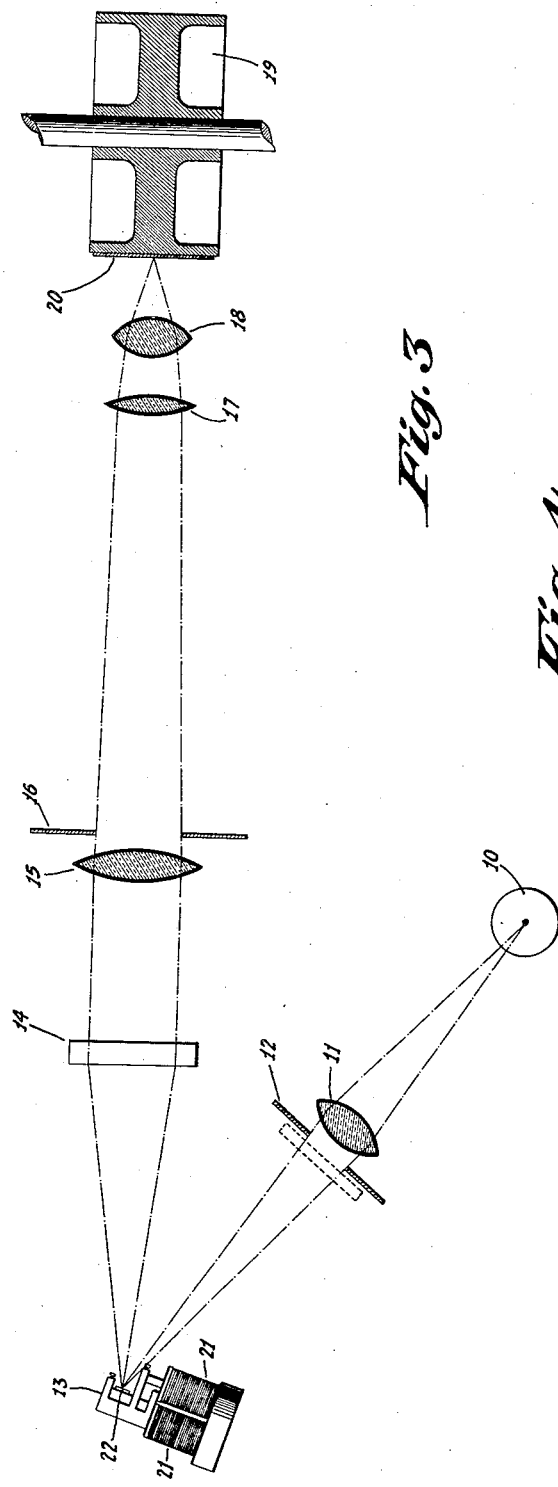
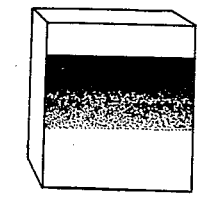

Patented Apr. 17, 1934

1,955,386

UNITED STATES PATENT OFFICE 1,955,386

TEST RECORD AND METHOD OF UTILIZING THE SAME

John A. Maurer, Jr., New York, N. Y., assignor to Radio Corporation of America, a corporation of Delaware Application August 1, 1931, Serial No. 554,518

4 Claims. (Cl. 88—14)

This invention relates to a record suitable for testing the optical alignment of sound recording and reproducing apparatus.

I have devised an apparatus which with a single adjustment may be utilized to produce a test record for testing the alignment of the optical system in connection with which the sound record is to be utilized. Sound reproducing and recording apparatus are usually arranged to project on the film a narrow line of light about one thousandth of an inch in width and about one tenth of an inch in length, this light line or luminous image being focussed upon the sound track which is moved longitudinally or across it. The light transmitted through the sound track of the film is received by a light sensitive cell which controls the operation of the sound reproducer.

It is essential for the proper operation of a sound reproducing or recording apparatus that the linear luminous image be not only accurately focussed upon the film, but also that it be exactly transverse of the sound track to within a few minutes of arc, approximately one fourth degree being the maximum allowable. This accurate adjustment of the luminous image is essential for the reason that the image used in the reproduction of sound must correspond exactly to the image used in making the record. Lack of correspondence in this respect produces distortion and decreases the volume of the reproduced sound.

Heretofore it has been extremely difficult to adjust the linear image to the necessary degree of accuracy, and poor sound reproduction has often resulted. The present invention provides a form of sound track which may be used separately or in conjunction with the usual sound track for adjusting the optical system of the apparatus. As hereinafter explained, this test track is so constructed that even very slight division of the slit from proper azimuth adjustment is clearly indicated. A further object of the invention is to provide a testing device consisting of a movable test track which will cause a relatively strong indication in the sound reproducer with a linear image if the optical system is slightly out of adjustment.

Another object is to provide a test track varying substantially instantly from very high transmission to very low transmission, and vice versa.

My invention will be better understood from the following description when considered in connection with the accompanying drawings, and its scope will be pointed out in the appended claims.

Figure 2:
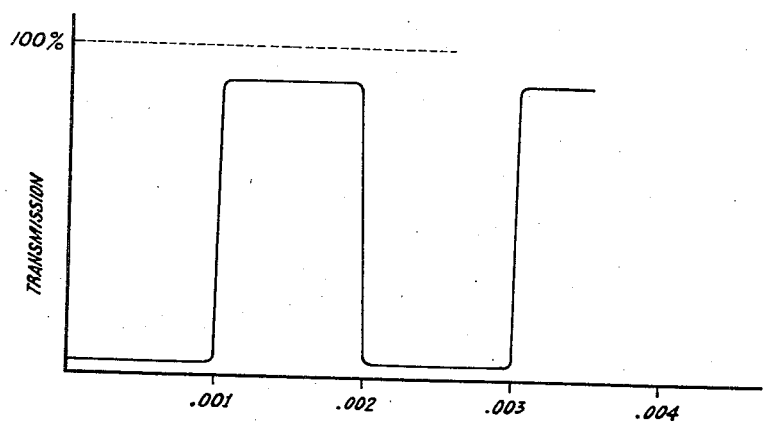

Referring to the drawings:

Fig. 1 illustrates a test record made in accordance with my invention;

Fig. 2 relates to certain characteristics of this test record;

Fig. 3 is a diagrammatic illustration of a recording apparatus wherein the invention has been embodied; and, Fig. 4 illustrates a light control member which is utilized in connection with the apparatus of Fig. 3 when it is desired to record sound by the variable density method.

The apparatus illustrated by Fig. 3 includes a light source 10, a spherical lens 11, a light stop 12, a galvanometer 13, a cylindrical lens 14, a spherical lens 15, a light slit member 16, objective lenses 17 and 18, and a suitable member shown as a rotatable wheel 19 arranged to move a film 20 across the path of a luminous image or light beam. In the operation of the device the impulses to be recorded are supplied to the coils 21 of the galvanometer 13, these coils being so associated with a mirror 22, as to cause it to vibrate about a horizontal axis in accordance with the character of the impulses. Light applied to this mirror from a source 10, through lens 11, and light stop 12, is projected through the cylindrical lens 14, the spherical lens 15, the light slit of the member 16, and the objective lenses onto the film 22. It will be apparent that the light slit 16 determines the heighth and width of the luminous image applied to the film 20. As previously indicated, the width of the slit in the member 16 is preferably made about one thousandth of an inch. The position of the luminous image of stop 12 with respect to the light slit, is of course dependent upon the position of the mirror 22.

When it is desired to produce a test record similar to that illustrated by Fig. 1, the impulses applied to the galvanometer coils are of constant frequency and large amplitude, the position of mirror 22 having previously been adjusted so that when no signal is being applied the image of stop 12 is just off the slit 16. Under the influence of these impulses the mirror is vibrated and the light beam is moved onto and off of the light slit at a constant frequency. By moving the film 20 at a suitable speed, transversely of the light beam, a series of alternate dark and white lines about one thousandth of an inch in width are produced. In utilizing this test record for determining whether or not the optical system of a sound reproducer is properly aligned, the record is passed through the reproducer. If the optical alignment is correct, a comparatively strong indication is produced in the loudspeaker or other suitable indicating device. If the alignment is inaccurate, a comparatively weak indication is produced. In the use of this test record it has been found that very small inaccuracies in the optical system may be readily detected. The light transmitting characteristics of the record illustrated by Fig. 1 are indicated in Fig. 2, transmission units being plotted as ordinants, and film length as abscissae.

If the apparatus of Fig. 3 is to be utilized for recording audio impulses of variable frequency, a light shading member such as that illustrated in Fig. 4 is utilized in conjunction with the light stop 12. It will be noted that this light stop varies in shade across the opening of the light stop. Under these conditions the intensity of the light beam projected through slit 16 is dependent on the position of mirror 22 which changes in accordance with the impulses applied to the galvanometer coils, and a sound record of the variable density type is produced on the film 20. As previously indicated, this arrangement has the advantage that the difficulty heretofore encountered in the use of light valves and similar devices, is avoided. The arrangement has the further advantage that by giving to the shading member shown in Fig. 4 an appropriate relation between its light absorption and the distance across it, it is possible to introduce a correction for the non-linear photographic characteristics of the films used in recording. Thus if, for example, the film at low exposures gives too low a resultant value of light transmission in the positive print, the darker end of the shading member is made somewhat lighter than it would be if it were desired to have the exposure bear a strictly linear relation to the angular position of mirror 22. By employing this method of correction it becomes possible to modulate the film over a greater range than is at present allowable in variable density recording.

Having thus described my invention and the operation thereof, what I claim is:

1. A test record including alternate opaque and transparent areas of substantially equal width, the said width being of the order of magnitude of the width of the light beam in optical systems to be tested thereby.

2. The method of testing the optical alignment of a sound reproducing device which includes passing through said device a test record composed of alternate opaque and transparent sections of substantially equal width, the said width being of the order of magnitude of the width of the light beam of the sound reproducing device and measuring the output current of said device.

3. A test record including alternate opaque and transparent areas of substantially the width of the beam from an optical system to be tested.

4. A test record including alternate opaque and trasparent areas of substantially equal width, the transparency of said areas being uniform over their entire width.

JOHN A. MAURER, Jr.